May 1, 1928. 1,668,457
W. KATH
RATE OF FLOW INDICATOR WITH ELECTRIC INTEGRATION FOR FLUIDS AND
GASES FLOWING THROUGH A VENTURI TUBE
Filed Aug. 24, 1921
*Fig. 1*
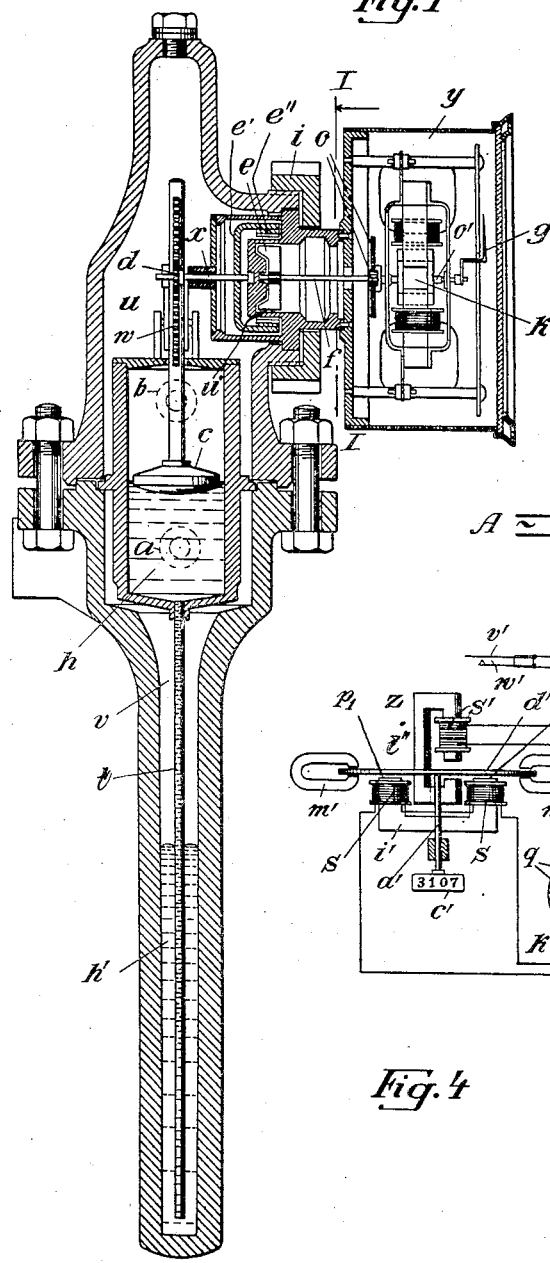
*Fig. 2*
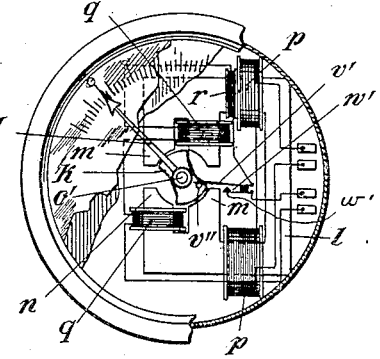
*Fig. 4*
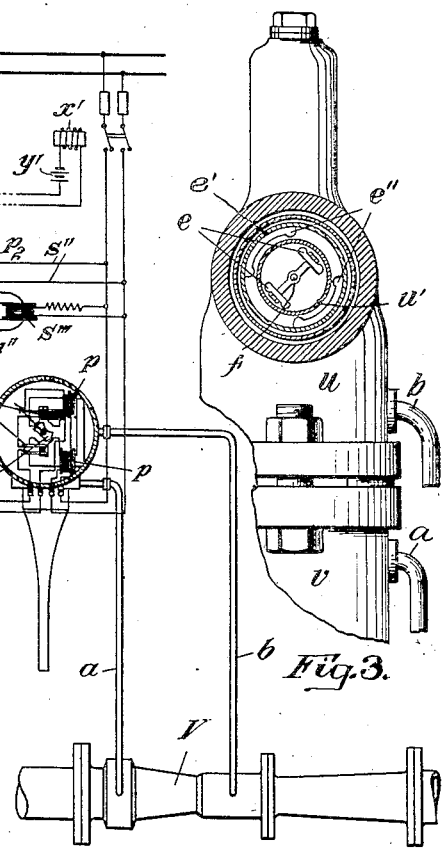
*Fig. 3.*
Inventor
Willy Kath
by Knight Bros
attorneys Patented May 1, 1928.

1,668,457

UNITED STATES PATENT OFFICE.

WILLY KATH, OF BERLIN-FRIEDENAU, GERMANY, ASSIGNOR TO SIEMENS & HALSKE AKTIENGESELLSCHAFT, OF SIEMENSSTADT, NEAR BERLIN, GERMANY, A CORPORATION OF GERMANY.

RATE-OF-FLOW INDICATOR WITH ELECTRIC INTEGRATION FOR FLUIDS AND GASES FLOWING THROUGH A VENTURI TUBE.

Application filed August 24, 1921, Serial No. 494,987, and in Germany March 16, 1918.

I have applied for and obtained patents in Germany, filed March 16th, 1918, Patent #311,378; Belgium, filed July 7th, 1920, Patent #288,809; France, filed July 7th, 1920, Patent #519,254; Italy, filed June 29th, 1920, Patent #186,859/531-156; Japan, filed June 25th, 1920, Patent #38,215; Austria, filed March 6th 1919, Patent #81,-488; Czechoslovakia, filed June 30th, 1920, Patent #5,463; Hungary, filed December 22nd, 1919, Serial No. S. 9661; and Poland, filed March 18th, 1920, Serial No. 2692, and of which the following is a specification illustrated in the accompanying drawings.

The particular novel features of my invention are more fully pointed out in the annexed claims.

My invention relates to rate of flow indicators of the type in which the fluctuations of a movable member, arranged in a pressure chamber which is connected to points of different pressure in a conduit especially in a Venturi tube, are transmitted to a pointer cooperating with a dial plate both located outside of said pressure chamber. More particularly the object is transmission to any remote plate by the aid of electric currents induced by the movement of the movable member or the pointer respectively.

The main object of the present invention is to keep the magnetic flux, causing the induction of currents, proportional to the extent of the movement of the pointer or the movable member in the pressure chamber respectively. This result is attained by maintaining the magnetic field constant, but shifting it in such manner as to deflect as many of the magnetic lines of force as are required to induce the necessary current in linear proportion to the displacement of said member.

Another object of the invention is to provide means whereby the induced currents are made use of to operate an integrator especially adapted for the purpose. These and other features of the invention will be more clearly pointed out in the following specification.

In the accompanying drawings Fig. 1 shows a sectional view of a constructional form of the invention according to the method mentioned above. Fig. 2 is a view from the right upon the casing containing the alternating current electromagnet showing the details of the assembling of the iron core, wire coils and alternating current magnet, Fig. 3 is a vertical section through the casing on the line I—I Fig. 1, showing the front view of the magnetic clutch for the pointer of the indicator, and Fig. 4 shows the general arrangement of the integrating device.

The fluid flowing through the Venturi tube V causes a drop of pressure between the two pipes connections $a$ and $b$ of the tube (Fig. 4). These pipes are connected to the rate of flow indicator. This apparatus comprises two pressure chambers $u$ and $v$ the lower one being connected to the pipe $a$, the upper one to the pipe $b$. Both chambers are connected by a small tube $t$ and are filled partly with mercury $h$, $h'$. A float $c$ is supported by the mercury $h$. It is connected to a rackbar $w$ engaging a gear $d$ which is fastened to a shaft $x$. A third chamber or casing $y$ is attached by cap nut $i$ to the sidewall of the chamber $u$ in such a manner that the pressure chamber $u$ is closed airtight. Within this casing $y$ another shaft $f$ is revolubly mounted which is coupled with the shaft $o'$ of the pointer $g$ by gear wheels $o$. The shafts $x$ and $f$ are connected by a magnetic clutch $e$ (Fig. 3). This clutch comprises a bell shaped body $e'$ fixed to the shaft $x$ and provided with two permanent magnet poles $e''$ and another system of permanent magnets $e$ connected to the shaft $f$. Both magnetic systems $e''$ and $e$ are separated by the airtight wall $u'$ closing the opening in the casing of chamber $u$ through which the clutch and the shaft $x$ are inserted. The pointer $g$ is according to the above described structure, driven by the float $c$ which is moved according to the loss of head in the Venturi tube, the pointer indicating the rate of flow. By giving the two manometer chambers $u$ and $v$ a special shape, the movement of the pointer can be made directly proportional to the rate of flow per hour, a method frequently used in practice.

In order to know at once the total flow through the Venturi tube for any given time, an iron armature $k$ (Figs. 1 and 2) is placed on the shaft $o'$ of the pointer $g$, so that it can rotate between the poles of an iron core $l$ bearing primary coils $p$ which are connected in series with a source of alternating current A (Fig. 4). The poles of this electromagnet are subdivided into two halves $m$ and $n$ of which the two obliquely opposite halves $n$ serve for the reception of two secondary coils $q$, connected in series with each other and with the driving coils $s$ of the integrator $z$ (Fig. 4).

The armature $k$ is represented in Fig. 2 in zero position. In this position nearly all lines of force pass along $m$, $m$, and no current will be generated in the coils $q$. If the iron core revolves to the right, it shifts the magnetic field in a linear ratio to the angle of rotation and a number of corresponding lines of force will pass through the coils $q$, generating here the current which acts as driving force for the integrator. The power of this current is consequently proportional to the rotary movement of the armature $k$ and to the motion of the pointer $g$ of the flow indicator respectively. Due to the distribution of the magnetic field some of the lines of force will also in zero position pass through the coils $q$ and will produce here a small current, causing thus an error in the integration. In order to avoid this, a coil $r$ is provided in which current is induced opposite to that induced in coils $q$ and which is so proportioned that in zero position no current is generated in the coils $q$.

Fig. 4 shows an example of the integrator $z$. Its driving coils $s$ are arranged on an iron core $i'$ the poles $p_1$, $p_2$ of which operate upon a metallic disc $d'$ supported by a shaft $a'$ which is journalled in the apparatus and coupled to a counter $c'$. Another magnet is formed by a rectangular core $i''$ bearing a coil $s'$ and having the disc $d'$ located in its air gap. A permanent magnet $m'$ operates as a brake for the disc $d'$. The disc rotates and moves the counter $c'$ according to the current induced in the coils $q$ by the displacement of the armature $k$. In order to take care of the frictional resistance of the integrator, the coil $s'$ of magnet $i''$ is connected directly to the source of current through the conductors $s''$, supplying it with just enough current so as to counteract the friction losses.

Such measuring devices have however sometimes the disadvantage, that the measurements of the indicator are dependent on the voltage of the source of supply. If the voltage increases or decreases, a smaller or larger amount of current will flow through the exciting coils $p$ and influence consequently also the current in the secondary coils $q$ in the same sense, so long as the armature $k$ does not stand just in zero position. An increase or decrease of the voltage of the alternating current source of supply will therefore cause an increase or decrease of the rate of flow indication. This disadvantage is further increased by the fact that also the coil for the small driving current for counterbalancing the internal friction of the integrator is exposed to this same change of voltage, the action of which only helps to increase the error.

To overcome this disadvantage another magnet $m''$ is arranged at the disc $d'$ working as a brake upon it. The exciting coil $s'''$ of this magnet is connected directly to the same source of alternating current A.

The action obtained by this arrangement is that the action of the brake $m''$ on the revolving disc $d'$ immediately becomes stronger as soon as, due to a stronger excitement of the transformer core $l$, more driving current is conducted through the secondary coils $q$.

In this manner it is possible to obtain a perfect independence of the integrator from rather large changes of the voltage of the alternating current source A.

In order to avoid counting when the armature $k$ is in zero position a switching device may be used. As shown in Fig. 2 this switch $w'$ is connected to the circuit of the secondary coils $q$. It comprises two contacts the upper one $v'$ of which is lifted by a lug $v''$ arranged on the armature $k$ when the armature approaches its zero position.

If the switch is arranged in such a manner that the source of alternating current for example by use of a relay $x'$ and a battery $y'$ is disconnected from all the parts of the indicator as shown in Fig. 4 also an economical effect is attained.

Having now described my invention, what I claim as new and desire to secure by Letters Patent is:—

1. A rate of flow indicator for Venturi tubes comprising two vessels communicating with each other, a liquid in said vessels, a float supported by the liquid in one of the vessels, a source of alternating current, a stationary iron core having two oppositely disposed poles, each pole being divided into two parts, a primary coil on said core connected to said source of alternating current for maintaining a magnetic field in that core, a secondary coil arranged on one part of at least one of said divided poles, an armature operated by said float and movably disposed between said poles and adapted when in normal position to guide the magnetic flux provided by said primary coil through the divided pole portions not carrying a secondary coil, said armature, when moved out of normal position gradually shifting said magnetic flux into said coil bearing pole portions, the magnetic flux thus passing through said secondary coil being substantially proportional to the extent of the armature movement and an electric device operated by the current induced in said secondary coil.

2. A rate of flow indicator for Venturi tubes comprising two vessels communicating with each other, a liquid in said vessels, a float supported by the liquid in one of the vessels, a source of alternating current, an iron core having two oppositely disposed poles, each pole being divided into two parts, a primary coil on said iron core connected to the source of alternating current for maintaining a magnetic field in said core, a secondary coil aranged on one divisional part of each pole, the coil carrying parts being in juxta-relation to each other, an armature operated by said float and movably disposed between said poles and adapted when in normal position to guide the magnetic flux produced by said primary coil through the divided pole portions not carrying a secondary coil, said armature when moved out of normal position gradually shifting said magnetic flux into said coil bearing pole portions, the magnetic flux thus passing through said secondary coils being substantially proportional to the extent of the armature movement and an electric measuring device connected with said secondary coil operated by the current induced in said coil.

3. A rate of flow indicator for Venturi tubes comprising two vessels communicating with each other, a liquid in said vessels, a float supported by the liquid in one of the vessels, a source of alternating current, a stationary iron core having two oppositely disposed poles, each pole being divided into two parts, a primary coil on said core, connected to said source of alternating current for maintaining a magnetic field in said core, a secondary coil arranged on one part of at least one of said divided poles, an armature operated by said float and movably disposed within said poles and adapted when in normal position to guide the magnetic flux provided by said primary coil through the divided pole portions not carrying a secondary coil, said armature, when moved out of normal position gradually shifting said magnetic flux into said coil bearing pole portions, the magnetic flux thus passing through said secondary coil being substantially proportional to the extent of the armature movement, a small correcting coil disposed on said iron core and connected in series with said secondary coil and being wound to have a low potential current induced in it by the core flux in a direction opposite to that of the secondary coil current and an electric measuring device connected with secondary coil operated by the current induced in said coil.

4. A rate of flow indicator for Venturi tubes comprising two vessels communicating with each other, a liquid in said vessels, a float supported by the liquid in one of the vessels, a source of alternating current, a stationary iron core having two oppositely disposed poles, each pole being divided into two parts, a primary coil on said core connected to said source of alternating current for maintaining a magnetic field in that core, a secondary coil arranged on one part of at least one of said divided poles, an armature operated by said float and movably disposed between said poles and adapted when in normal position to guide the magnetic flux provided by said primary coil through the divided pole portions not carrying a secondary coil, said armature, when moved out of normal position gradually shifting said magnetic flux into said coil bearing pole portions, the magnetic flux thus passing through said secondary coil being substantially proportional to the extent of the armature movement, and a switch electrically arranged in the circuit of said secondary coil and mechanically arranged in suitable relation to said armature and means on said armature for opening said switch when the armature reaches its normal or zero position.

5. Apparatus for electrically transferring different positions of a movable element, comprising an alternating current source, a stationary iron core having two oppositely disposed poles, each pole being divided into two parts, a primary coil on said core connected to said alternating current source for maintaining a magnetic field in that core, a secondary coil arranged on one part of at least one of said divided poles, an armature operatively connected to said movable element and disposed between said poles and adapted when in normal position to guide the magnetic flux produced by said primary coil through the divided pole portions not carrying a secondary coil, said armature, when moved out of normal position by said element, gradually shifting said magnetic flux into said coil bearing pole portions, the magnetic flux thus passing through said secondary coil being substantially proportional to the extent of the armature movement.

In testimony whereof I affix my signature.

WILLY KATH.